united States Patent Office 3,267,152
Patented August 16, 1966

3,267,152
MIXED SALTS OF TITANIUM AS ORTHO-ALKYLATION CATALYSTS
Takeo Hokama, Pittsburgh, Pa., assignor to Koppers Company, Inc., a corporation of Delaware
No Drawing. Filed Aug. 13, 1963, Ser. No. 301,898
7 Claims. (Cl. 260—619)

This invention relates to the alkylation of hydroxy-aromatic hydrocarbons. In one specific aspect, it relates to the selective alkylation of hydroxyaromatic hydrocarbons, particularly phenols, in a ring position ortho- to the hydroxyl group.

Conventional methods of alkylation, such as Friedel-Crafts alkylation, result in a more or less random introduction of alkyl groups onto the ring of aromatic hydrocarbons, with any preferential alkylation resulting from the steric configuration of the particular aromatic hydrocarbon being alkylated. Friedel-Crafts alkylation involves reacting an aromatic hydrocarbon with a halogenated aliphatic hydrocarbon in the presence of e.g., aluminum chloride. In addition to providing a non-specific distribution of the various alkylated isomers, the Friedel-Crafts alkylation process suffers the additional disadvantage of the rearrangement of the carbon skeleton when branched chain hydrocarbons are introduced.

A great step forward in the alkylation art was made by George G. Ecke and Alfred J. Kolka, who found that certain metal aryloxides were efficient for the selective ortho-alkylation of phenolic bodies when used as described in U.S. Patent No. 2,821,898. In their patent Ecke et al. describe the selective ortho-alkylation of phenols using the phenoxy derivatives of such elements as aluminum, magnesium, iron, zinc, phosphorus, arsenic, antimony, bismuth and tin.

The pioneer work of Ecke and Kolka created the illusion that a simple choice of a desired metal phenolate was the key to all of the problems of selective ortho-alkylation. Unfortunately, this hope has not been realized. The metal phenolates (or aryloxides) when used as alkylation catalysts, behave in the unpredictable manner typical of most catalyst systems. Of the phenoxy derivatives included in the Ecke et al. patent, only aluminum phenoxide is an excellent catalyst for ortho-alkylation. Magnesium phenoxide is good, and zinc phenoxide is acceptable. The phenoxides of the other metals specifically named by Ecke and Kolka show a mediocre to poor performance as selective ortho-alkylation catalysts.

The use of metal aryloxides as ortho-alkylation catalysts has engendered numerous problems that were unforeseen at the time of their introduction to the art. With respect to the performance of the catalyst, there has been an increasing demand for catalysts capable of providing higher and higher selectivity, as determined by the ratio of ortho- to para-isomers present in the final product. Aluminum phenoxide, which is regarded as an excellent ortho-alkylation catalyst, provides, in many instances, a product mixture having an o/p ratio of 15:1 to 40:1. Less effective phenoxides, such as zinc phenoxide, provide an o/p ratio of only 2:1 to 4:1.

Reaction time, of course, is an important commercial consideration. Many of the metal aryloxides named by Ecke et al. are so sluggish in their behavior that the required reaction time becomes prohibitive. Other important considerations include the stability of the catalyst, particularly to moisture, ease of catalyst recovery, and effectiveness of the catalyst on repeated recycle.

Prior attempts to find metal phenoxides useful for selective ortho-alkylation other than those named by Ecke and Kolka, have met with uniform lack of success. It was believed, based on experience with titanium phenoxide, that titanium catalysts were completely ineffective as alkylation catalysts. Titanium phenoxide, as shown in comparative Example II, after three hours provided only a 14.7 percent concentration of ortho-alpha-methylbenzylphenol in the reaction mixture when used for styrenation of phenol, a relatively simple alkylation.

I have discovered that, unexpectedly, a carefully balanced mixed salt of titanium provides good ortho selectivity and is sufficiently active as a catalyst to effect a reasonable rate of ortho-alkylation.

It is, therefore, an object of the present invention to provide a new selective ortho-alkylation process resulting in good selectivity of ortho-alkylation at a commercially acceptable rate.

In accordance with the invention, a hydroxyaromatic hydrocarbon containing at least one reactive hydrogen in a ring position ortho- to a hydroxyl group is reacted with an olefin at an elevated temperature and a pressure up to 3,000 p.s.i. in the presence of a catalytic amount of a mixed salt of titanium containing both aryloxide and arylsulfonate groups in a carefully balanced proportion.

The hydroxyaromatic hydrocarbons useful in the invention include all of those conveniently subjected to the alkylation reactions of the heretofore-known art which have at least one reactive hydrogen in a ring position ortho- to a hydroxyl group. The hydroxyaromatic hydrocarbons can be mono- or polynuclear and also mono- or polyhydroxy; most commonly they are the hydroxybenzenes, hydroxynaphthalenes, bis-phenols and their lower alkyl-, phenyl-, benzyl-, halo- and amino-substituted derivatives. Useful starting materials thus include, phenol, o-cresol, m-cresol, p-cresol, o-, m-, and p-chlorophenol, 2,5-dichlorophenol, thymol, m-ethylphenol, p-t-butylphenol, carvacrol, mono-bromocarvacrol, catechol, resorcinol, pyrogallol, alpha-naphthol, mono-chloro-beta-naphthol, o-phenylphenol, p-phenylphenol, alpha-anthrol, o-, m-, and p-aminophenol, guaiacol, anol, eugenol and iso-eugenol.

The olefins useful for alkylation according to the invention also include all of those commonly known to the alkylation art; in particular mono- or polyolefins, cycloolefins, aryl-substituted olefins, and halo-substituted olefins. Conventional alkylating agents are those having up to 8–12 carbon atoms, although high molecular weight olefins up to those containing about 20 carbon atoms can be used. Useful olefins thus include ethylene, propylene, butylene, isobutylene, amylene, isoamylene, hexene, heptene, butadiene, isoprene, chloroprene, diisobutylene, heptadiene, octene, decene, dodecene, hexadecene, octadecene, eicosene, styrene, alpha-methylstyrene, 2-phenylpropene-1, 2-phenylbutene-1, and the like.

The catalyst used in the invention is a mixed salt of titanium having both aryloxide and arylsulfonate groups in an average proportion corresponding to the formula:

$$Ti(OAr)_n \cdot (Ar'SO_3)_{4-n}$$

wherein $n$ has an average value of 3.0–3.9 and Ar and Ar' are aryl radicals independently selected from the group consisting of phenyl; lower alkyl phenyl, such as o-, m-, and p-tolyl, and xylyl; hydroxyphenyl; and halo-phenyl, such as mono- or dichlorophenyl.

The catalyst can be made from the titanium aryloxide, which is preferably made by reacting a titanium tetra-halide, such as titanium tetrachloride, titanium hydroxide, or a titanium alkoxide, such as titanium isopropoxide or titanium butoxide, with an aromatic hydrocarbon, such as phenol, halophenols, naphthol, a polyhydroxy phenol, a bisphenol or a lower alkylphenol. Conveniently, the phenol used in the formation of the titanium aryloxide is that being subjected to alkylation in the process of the invention, or one of those which is obtained as an alkylation product.

Since the arylsulfonic acids are stronger acids than the phenols, to prepare the catalyst of the invention the titanium aryloxide is reacted with an appropriate quantity of an arylsulfonic acid according to the following equation:

$$Ti(OAr)_4 + 4-nAr'SO_3H \rightarrow Ti(OAr)_n(Ar'SO_3)_{4-n} + nArOH \quad (I)$$

Suitable arylsulfonic acids include benzenesulfonic acid, p-toluenesulfonic acid, p-phenolsulfonic acid, m-phenolsulfonic acid, chlorosulfonic acid, and the like.

Alternatively, the catalyst may be made directly by reacting an appropriate titanium salt, preferably a titanium alkoxide, with a mixture of the desired phenol and arylsulfonic acid in suitable proportions.

The catalyst of the invention is actually a mixture of salts having as its average composition the formula indicated hereabove. The relative proportion of aryloxide groups and arylsulfonate groups contained by the mixed salt is of particular importance. As noted hereabove comparative Example II shows that titanium phenoxide is too sluggish as an ortho-alkylation catalyst even for a simple alkylation such as styrenation; there being obtained only 14.7 percent of the desired product in the reaction mixture. Comparative Example III shows that the titanium salt of an arylsulfonic acid, such as titanium tosylate, although it is sufficiently active to cause alkylation to proceed at a reasonable rate, is not a selective ortho-alkylation catalyst. Surprisingly, the mixed titanium salt containing aryloxide and arylsulfonate groups in a carefully balanced proportion provides selective ortho-alkylation at an acceptable rate.

If the value of $n$ in the above formula is less than 3, the reaction is slow and the selectivity is poor. If the value of $n$ is greater than 3.9, the rate of reaction is very slow, although the selectivity is acceptable.

The amount of catalyst used generally ranges between about 0.05 and 15 mole percent, based on the number of moles of the material to be alkylated. Although the preferred amount of ratalyst varies to some extent with the degree of alkylation desired, if less than 0.05 mole percent catalyst is used alkylation is quite slow. For economic reasons no advantage is seen in using more than 15 mole percent catalyst, although no adverse effects are obtained thereby. I prefer to use between about 0.3 and 10 mole percent catalyst for ease of reaction and economical operation.

The alkylation reaction is exothermic. It proceeds smoothly at elevated temperatures as low as 50° C. up to the boiling point of the reaction mixture under the particular pressure applied. Most alkylation reactions can be run at temperatures between 50 and 400° C., preferably between 125 and 300° C.

The reaction is run at pressures ranging from atmospheric pressure up to about 3,000 p.s.i.g. For the simple alkylations, for example, the alkylation of phenol or cresol with isobutylene or styrene, the reaction proceeds well at atmospheric pressure or low positive pressures and, from the standpoint of equipment costs, the use of these low pressures is most desirable. The more difficult alkylations involving, for example, alkylation with ethylene, high positive pressures in the range of 1200 to 3000 p.s.i.g. are required. It is obviously advantageous for economic reasons to run the reaction at the lowest convenient pressure.

The degree of alkylation depends upon the number of alkylatable positions on the hydroxy aromatic hydrocarbon and the mole ratio of the reactants. Mono-alkylations can be accomplished using from about 0.3–1.2 moles of olefin per mole of hydroxyaromatic compound. It is often convenient, from the standpoint of avoiding dialkylation, to use considerably less than the stoichiometric quantity of olefin. In this case a high ultimate yield of monoalkylated product is obtained by recycle. The use of 0.3–0.9 mole of olefin, accompanied by recycle is desirable from the standpoint of obtaining a maximum ultimate yield of monoalkylated product. Dialkylated products are obtained according to the invention by using 1.3–2.5 moles of olefin per mole of hydroxyaromatic hydrocarbon. The lower mole ratios within the indicated range are used when it is desired to avoid the formation of trialkylated products.

The reaction time can be conveniently determined by measuring the amount of olefin absorbed by the reaction mixture. Alternatively, the reaction mixture may be repeatedly sampled and the constitution of the samples can be determined by vapor phase chromatography, as shown in the examples that follow.

Conveniently, alkylation is conducted in the absence of a solvent, although, if desired, any solvent which is inert to the reactants and catalysts under the conditions of the reaction can be employed. Suitable solvents include benzene, toluene, xylene, tetralin, decalin, hexane, heptane, cyclohexane and the like.

The reaction product of the invention, although primarily a mono-ortho- or di-ortho- (depending upon the reaction conditions and mole ratio of ingredients) hydroxyaromatic hydrocarbon, also contains unreacted starting material and minor percentages of other isomers.

The product can be isolated by removing the reaction mixture from the catalyst by fractional distillation or by flash distillation followed by fractional distillation. These procedures are most desirable since they permit the retention of the catalyst in usable form.

Instead of fractionating the catalyst-free product, the desired material can be isolated by adding sufficient base to the reaction mixture to neutralize the catalyst and to convert the unhindered phenols contained in the product to their salts. This can be followed by extraction of the desired compound or compounds with organic, water-immiscible solvents or by steam distillation followed by separation of the layers, extraction of the product or distillation.

Several methods are also available if the catalyst is to be destroyed. The catalyst may be deactivated by neutralization with the required amount of base. The base may be added per se as an aqueous solution. If desired, filtration of the resultant solid on separation of an aqueous layer may be carried out, but it is not necessary to do so. The catalyst may also be hydrolyzed by the addition of water, followed, if desired, by filtration or separation by aqueous acid, followed by separation of the layers.

The operation can be conducted batch-wise or continuously, as desired. Unreacted starting materials and catalyst may be recycled for use in a subsequent run.

The compounds made by the process of my invention have well established uses in the art, such as monomers for phenolic resins, detergent intermediates, germicides, polymerization inhibitors, antioxidants, and the like.

My invention is further illustrated by the following examples:

*Example I.—Styrenation of phenol*

Tetrabutyl titanate, 5.4 g. (0.016 mole) was added to dry phenol (azeotroped with xylene, 104 g., 1.10 moles), and the xylene-n-butanol mixture was distilled. p-Toluenesulfonic acid, monohydrate, 0.990 g. (0.0052 mole), and xylene, 50 ml., were added to the phenol, and the xylene-water mixture was distilled. The catalyst corresponds to the over-all empirical formula:

$$Ti(OC_6H_5)_{3.67}\left(\begin{matrix}CH_3\\|\\C_6H_4SO_3\end{matrix}\right)_{0.33}$$

Styrene, 105 g. (1.01 moles) was added over a 15 minute period at 150° with the reaction temperature dropping to 130° during the addition. The reaction mixture was refluxed for 1.25 hours with the reaction temperature rising (205°). The reaction mixture was sampled, and the sample was analyzed by gas chromatography. The results showed 16.1 (area) percent phenol, 58.4 percent o-(alpha-methylbenzyl) phenol, 3.9 percent p-(alpha-methylbenzyl) phenol, 14.6 percent 2,6-bis(alpha-methylbenzyl)phenol and 3.1 percent 2,4-bis(alpha-methylbenzyl)phenol.

*Example II.—Styrenation of phenol with titanium phenoxide catalyst*

A mixture of 3.40 g. (10 mmoles) of tetrabutyl titanate, 100 g. of phenol and 10 ml. of xylene was distilled in a 15 in. glass helix-packed column at atmospheric pressure. There was collected 7.8 g. (9.4 ml.) boiling at 116–135°. Of this, about 0.2 g. was water. After removal of the water, the rest was dried ($Na_2SO_4$) and analyzed by V.P.C. Duplicate determinations showed 38.8 and 39.5 percent butanol. This corresponds to a recovery of 2.96 g. (39 percent×7.6 g.) or 100 percent of theory. To the distillation residue which was heated to 150° with stirring, 100 g. of styrene was added dropwise over nine minutes. At the end of this time, the temperature had dropped to 129° and the first sample was withdrawn. Additional samples were taken, 0.5, 1.5, and 3.0 hours after completion of the addition while the temperature rose to 150°.

After treatment with solid sodium carbonate and dilution with benzene, the samples were analyzed by V.P.C with the following results:

| Sample | 1 | 2 | 3 | 4 |
|---|---|---|---|---|
| Reaction Time (Hrs.) (After Addition) | 0 | 0.5 | 1.5 | 3 |
| | Area, Percent | | | |
| Styrene | 53.7 | 51.0 | 45.0 | 34.9 |
| Phenol | 46.3 | 44.5 | 45.7 | 43.0 |
| Unknown I | 0 | 1.2 | 2.0 | 2.5 |
| o-(alpha-methylbenzyl)phenol | 0 | 2.6 | 6.5 | 14.7 |
| Unknown II | 0 | 0.7 | 0.8 | 3.8 |
| p-(alpha-methylbenzyl)phenol | 0 | 0 | 0 | 0.3 |
| 2,6-bis(alpha-methylbenzyl)phenol | 0 | 0 | 0 | 0.4 |
| 2,4-bis(alpha-methylbenzyl)phenol | 0 | 0 | 0 | 0.4 |

It is thus seen that titanium phenoxide is ineffective as an ortho-alkylation catalyst.

*Example III.—Styrenation of phenol with titanium tosylate*

A mixture of phenol, 99 g. (1.05 mole), p-toluenesulfonic acid, monohydrate, 7.6 g. (0.040 mole), tetrabutyl titanate, 3.4 g. (0.010 mole), and xylene, 50 ml., was refluxed for 2 hours using a Dean-Stark trap to remove water. Styrene, 96 g. (0.92 mole), was added to 160–170° over a 15 minute period. The mixture was heated at 150–160° for 1.5 hours and sampled. The sample was analyzed by gas chromatography, and the results showed 22.9 percent phenol, 34.1 percent o-(alpha-methylbenzyl)phenol and 42.9 percent of the para-isomer.

It can be seen from the above results that the selectivity is completely lost (ortho/para ratio 0.8) when $n=0$ (in the formula, supra) i.e. the catalyst corresponds to the formula:

$$Ti(Ar'SO_3)_4$$

*Example IV.—Styrenation of phenol*

A mixture of phenol, 106 g. (1.12 moles), p-toluenesulfonic acid, monohydrate, ·38 g. (0.020 mole), tetrabutyl titanate, (0.011 mole), and xylene was refluxed for 1.25 hours using a Dean-Stark trap to remove water. The catalyst corresponds to the average empirical formula:

$$Ti(OAr)_{2.2}(Ar'SO_3)_{1.8}$$

where Ar is phenyl and Ar' is p-tolyl. Styrene, 96 g. (0.92 mole) was added at 156–165° over a 15 minute period (exothermic reaction). The reaction mixture was heated at 175–190° for 3 hours, and sampled. The sample was analyzed by gas chromatography and the results showed 34.4 (area) percent phenol, 34.4 percent o-(alpha-methylbenzyl)phenol, 18.0 percent para-isomer, 4.8 percent, 2,6-bis(alpha-methylbenzyl)phenol and 8.2 percent of the 2,4-isomer.

*Example V.—Styrenation of phenol*

Tetrabutyl titanate, 4.6 g. (0.0135 mole) was added to dry phenol (xylene azeotroped, 103 g., 1.09 mole) and the mixture was distilled to remove n-butanol-xylene mixture. p-Toluenesulfonic acid, monohydrate, 1.89 g. (0.0099 mole) and xylene, 10 ml., were added, and the mixture was distilled to remove a water-xylene mixture. The catalyst corresponds to the average empirical formula:

$$Ti(OAr)_{3.2}(Ar'SO_3)_{0.8}$$

Styrene, 104 g. (1.00 mole) was added at 160° over a fifteen minute period with the temperature rising to 185° during the addition period. The reaction mixture was heated at 175–185° for one hour and sampled. The sample was analyzed by gas chromatography and showed 11.5 (area) percent phenol, 59.1 percent o-(alpha-methylbenzyl)phenol, 4.9 percent of para-isomer, 15.1 percent 2,6-bis(alpha-methylbenzyl)phenol and 9.3 percent of the 2,4-isomer.

By comparing the foregoing five examples with respect to activity (rate of reaction) and selectivity (ortho/para ratio), it may be seen that only by choosing a value of $n$ within the limits prescribed according to the method of the invention are good results obtained.

*Example VI.—Styrenation of phenol*

A mixture of phenol, 94.0 g. (1.0 mole), sulfuric acid, 0.57 g. (0.005 mole), and benzene, 50 ml., was refluxed using a Dean-Stark trap to remove water. Tetrabutyl titanate, 5.1 g. (0.015 mole) and xylene, 50 ml., were added to the mixture and a mixture of benzene, n-butyl alcohol and xylene was distilled from the reaction mixture. Styrene, 93.6 g. (0.90 mole) was added over a 15 minute period at 130–150° (no exotherm). The mixture was refluxed for two hours, sampled and neutralized with 50 percent sodium hydroxide solution, 1 g. The sample was analyzed by gas chromatography and showed 19.7 (area) percent phenol, 61.6 percent o-(alpha-methylbenzyl) phenol, 9.3 percent para-isomer, and 9.3 percent 2,6-bis (alpha-methylbenzyl)phenol. No 2,4-isomer was found.

The reaction mixture was distilled through a two-foot packed column at 20 mm. Hg. The following fractions were obtained: xylene-styrene to 26°; 26.5 g. phenol at 76–90° (84°); 4.7 g. intermediate I [20 percent phenol–80 percent o-(alpha-methylbenzyl)phenol] at 92–182°, 80.1 g. o-(alpha-methylbenzyl)phenol at 182–190° (185°) and 11.5 g. intermediate II (26 percent ortho–74 percent para-isomer) above 190°.

*Example VII.—t-Butylation of phenol*

A mixture of 855 g. (9.10 moles) of phenol, p-toluenesulfonic acid monohydrate, 9.5 g. (0.05 mole), tetrabutyl titanate, 34.0 g. (0.10 mole) and xylene 30 ml. was distilled to remove water, n-butanol and xylene. The residue was charged to one-gallon autoclave and reacted with isobutylene at 175° C. and 200 p.s.i.g. (nitrogen) during three hours. Gas chomatographic anaylsis of the final sample showed 9.4 (area) percent phenol, 39.3 percent o-t-butylphenol, 10.8 percent p-t-butylphenol, 9.3 percent 2,6-di-t-butylphenol, 26.1 percent 2,4-isomer and 5.1 percent tri-t-butylphenol.

*Example VIII.—t-Butylation of o-cresol*

The procedure of Example VII was followed except that 1003 g. (9.53 moles) of o-cresol was used in place of the phenol, and the p-toluenesulfonic acid was replaced by phenolsulfonic acid (0.10 mole). The alkylation was carried out at 150° C. for three hours and yielded (by gas chromatographic analysis) 46.0 percent o-cresol, 41.2 percent 6-t-butyl-2-methylphenol, 5.2 percent 4-t-butyl-2-methylphenol and 7.6 percent 4,6-di-t-butyl-2-methylphenol.

Example IX.—Isopropylation of m-Cresol

The procedure of Example VII was followed except that the phenol was replaced with 1105 g. (10.23 moles) of m-cresol. Propylene was added for six hours at 265–275° C. at 225 p.s.i.g. (nitrogen and propylene). The autoclave was vented periodically to prevent build-up of nitrogen. Gas chromatographic analysis of the final product showed 53.2 (area) per cent m-cresol, 33.8 percent thymol and 2-isomer, and 13.0 percent higher boiling components (mostly 4-isomer and diisopropyl-m-cresols).

I claim:

1. In a process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature and a pressure up to 3000 p.s.i.g., the improvement comprising conducting the reaction in the presence of a catalytic amount of a mixed salt of titanium having the empirical formula:

$$Ti(OAr)_n \cdot (Ar'SO_3)_{4-n}$$

wherein Ar and Ar' are independently selected from the group consisting of phenyl, lower alkylphenyl, hydroxyphenyl and halophenyl and $n$ has an average value of 3.0–3.9.

2. In a process for the selective catalytic ortho-alkylation of a hydroxyaromatic hydrocarbon containing at least one reactive hydrogen in a position ortho- to a hydroxyl group wherein said hydrocarbon is reacted with an olefin at an elevated temperature and a pressure up to 3000 p.s.i.g., the improvement comprising conducting the reaction in the presence of 0.05–15 mole percent, based on the number of moles of hydroxyaromatic hydrocarbon being subjected to alkylation, of a mixed salt of titanium having the empirical formula:

$$Ti(OAr)_n \cdot (Ar'SO_3)_{4-n}$$

wherein Ar and Ar' are independently selected from the group consisting of phenyl, lower alkylphenyl, hydroxyphenyl and halophenyl and $n$ has an average value of 3.0–3.9.

3. A process for the selective ortho-alkylation of phenol comprising reacting phenol with up to 2.5 moles, per mole of phenol, of an olefin having up to 20 carbon atoms at a temperature of 50–400° C. at a pressure of up to 1200 p.s.i.g. in the presence of 0.3–10 mole percent, based on the number of moles of phenol, of a mixed salt of titanium having the empirical formula:

$$Ti(OAr)_n \cdot (Ar'SO_3)_{4-n}$$

wherein Ar and Ar' are independently selected from the group consisting of phenyl, lower alkylphenyl, hydroxyphenyl and halophenyl and $n$ has an average value of 3.0–3.9.

4. A process for the selective ortho-alkylation of cresol comprising reacting cresol with up to 2.5 moles, per mole of cresol, of an olefin having up to 20 carbon atoms at a temperature of 50–400° C. at a pressure of up to 1200 p.s.i.g. in the presence of 0.3–10 mole percent, based on the number of moles of cresol, of a mixed salt of titanium having the empirical formula:

$$Ti(OAr)_n \cdot (Ar'SO_3)_{4-n}$$

wherein Ar and Ar' are independently selected from the group consisting of phenyl, lower alkylphenyl, hydroxyphenyl and halophenyl and $n$ has an average value of 3.0–3.9.

5. A process for the selective ortho-t-butylation of phenol comprising reacting phenol with 2.5 moles, per mole of phenol, of isobutylene at a temperature of 125–300° C. at a pressure of up to 1200 p.s.i.g. in the presence of 0.5–10 mole percent, based on the number of moles of phenol, of $Ti(OC_6H_5)_{3.5} \cdot (p\text{-}CH_3C_6H_4SO_3)_{0.5}$.

6. A process for the selective ortho-styrenation of phenol comprising reacting phenol with up to 2.5 moles, per mole of phenol, of styrene at a temperature of 125–300° C. at a pressure of up to 1200 p.s.i.g. in the presence of 0.5–10 mole percent, based on the number of moles of phenol, of $Ti(OC_6H_5)_{3.67} \cdot (p\text{-}CH_3C_6H_4SO_3)_{0.33}$.

7. A process for the selective ortho-isopropylation of m-cresol comprising reacting phenol with up to 2.5 moles, per mole of m-cresol, of propylene at a temperature of 125–300° C. at a pressure of up to 1200 p.s.i.g. in the presence of 0.5–10 mole percent, based on the number of moles of m-cresol of $$Ti(OC_6H_5)_{3.5} \cdot (p\text{-}CH_3C_6H_4SO_3)_{0.5}$$

No references cited.

LEON ZITVER, *Primary Examiner.*

D. M. HELFER, *Assistant Examiner.*